Patented Jan. 19, 1932

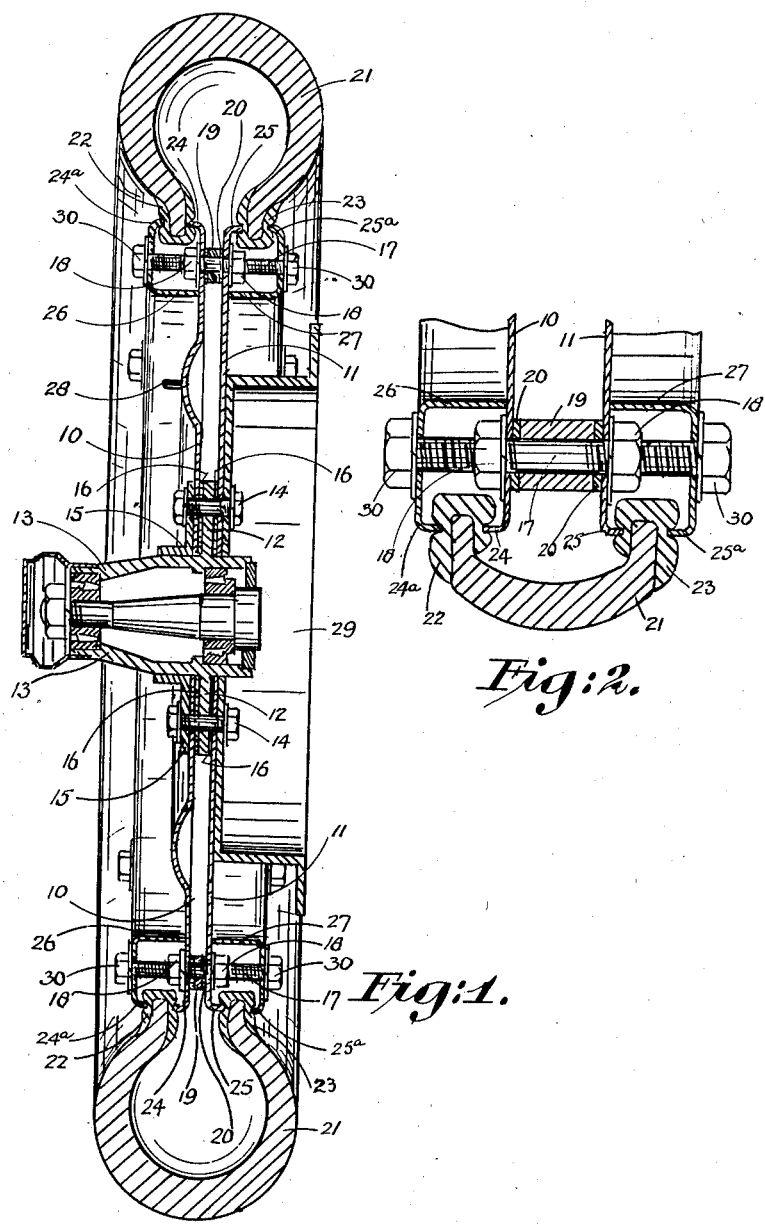

1,842,315

UNITED STATES PATENT OFFICE

MOSTYN REEVE CONIGRAVE, OF LEEDERVILLE, NEAR PERTH, AUSTRALIA

PNEUMATIC WHEEL FOR VEHICLES

Application filed November 27, 1929, Serial No. 410,182, and in Australia September 9, 1929.

The object of this invention is to provide a pneumatic wheel for vehicles, but principally for motor vehicles, and which wheel by reason of its being formed with a cavity or of hollow formation is enabled to contain a volume of compressed air which is in constant communication with the interior of a surrounding tyre, thus ensuring a maximum resiliency to said wheel.

An advantage of this invention, in which the wheel is of cavity formation, is that it enables the use of a tyre having a lesser depth than heretofore and consequently requiring a reduced amount of material in manufacture, while the abundant volume of compressed air in said cavity wheel acts as a constant air cushion for the tyre.

A further advantage of the invention is that the usual air tube is dispensed with consequently eliminating troubles arising from punctures and blow-outs, also by the provision made within the wheel for the greater volume of air, same is maintained at a lower pressure and temperature than under existing conditions to which air is subject in the said tube as heretofore.

The invention comprises a wheel made of a cavity or hollow formation and through a circumferential passage the therein compressed air is in constant communication with the surrounding tyre.

The invention also embodies improved means whereby the tyre is secured to the rim of the wheel effecting an air tight junction, and also whereby the disc plates of the wheel are secured to each other in an air-tight manner.

The construction of the invention will be described with the aid of the accompanying drawings wherein Fig. 1 is an end sectional view of a wheel made in accordance with this invention.

Fig. 2 shows a tyre of a reduced depth to that as heretofore employed.

Referring to said drawings, the wheel comprises companion disc plates 10—11, each of which may be of a cambered or other approved section. These plates at their central locality are secured to the peripheral flange 12 of the hub 13 by means of bolts 14, passing through said flange 12, disc plates 10 and 11, bracket 15 and sealing rings 16, the latter made of rubber or analogous natured material, the purpose of said rings 16 is to effect an air-tight seal at the junctional contact of said plates 10—11 with the bolts 14. These plates are at their outer peripheral locality secured to each other by bolts 17 and nuts 18, while positioned between said plates and held on said bolts are distance collars 19, between said collars 19 and the interior faces of said plates 10—11 are placed sealing rings 20 whose purpose is to effect an air tight seal junctionally with the bolts 17 and plates 10—11. The tyre 21 may be of the form shown in Fig. 1 or of a reduced depth as shown in Fig. 2.

Referring to the means for securing said tyre to the wheel in an air tight junction, the beadings 22—23 are made of a more pliable material or nature than the main body of the tyre. These beadings act as sealing, packing and wearing agents and may either be made integral with the tyre or be made grooved as shown and attachable thereto thus enabling renewals to be effected when said beadings become worn.

The outer peripheral edges of the disc plates 10—11 are each formed with an outwardly projectional lip as 24—25 respectively, which embed or press into the inner faces of the said beadings 22—23 when the clamping plates hereinafter mentioned are screwed up by means of the outer nuts 30 on the bolts 17. In this junction between the tyre and wheel I employ adjustable circular clamping plates of channel or other section, the short lips of which as 24a—25a embed or press into the outer faces of said beadings 22—23 when said clamping plates are screwed up by means of the outer nuts 30 on the bolts 17, whilst at the same time the long flanges 26—27 make contact against the outer faces of the disc plates 10—11, the clamping plates being rigidly held in position by lock washers and nuts 30 on said bolts 17 passing through same and also through the disc plates 10—11.

The lips 24—25—24a and 25a may be milled on their face edges to prevent the tyre from creeping around the wheel. The wheel as a unit is fitted with a valve 28 for inflating same.

In changing the tyre it is only necessary to release the clamping plates without any disturbance of the other parts of the wheel. Further, when the wheel is used on motor vehicles, to same is secured a brake band casing 29 and related members (not shown).

It is to be understood that I do not limit myself to the precise means for effecting an air tight junction between the tyre and the wheel but that as shown and herein described is the preferred embodiment, as it is obvious that same may be varied without departing from the scope and ambit of the invention.

What I claim as my invention and desire to secure by Letters Patent, is:—

A vehicle tire, comprising a pair of rings of resilient material spaced apart having their outer peripheries connected by an annular member also formed of resilient material, and a pair of annular members each formed of material of greater resiliency than said rings and each having a substantially U-shaped portion straddling the inner periphery of one of said rings, the arms of each of said U-shaped portions which is disposed against the outer side of the ring associated therewith being longer than the other arm of such portion.

In testimony whereof I have hereunto set my hand.

MOSTYN REEVE CONIGRAVE.